United States Patent
Chang et al.

(10) Patent No.: US 11,435,852 B2
(45) Date of Patent: Sep. 6, 2022

(54) TOUCH SENSITIVE PROCESSING APPARATUS AND TOUCH SYSTEM AND TOUCH SENSITIVE PROCESSING METHOD THEREOF

(71) Applicant: EGALAX_EMPIA TECHNOLOGY INC., Taipei (TW)

(72) Inventors: Chin-Fu Chang, Taipei (TW); Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 17/559,016

(22) Filed: Dec. 22, 2021

(65) Prior Publication Data
US 2022/0197470 A1    Jun. 23, 2022

Related U.S. Application Data

(60) Provisional application No. 63/128,905, filed on Dec. 22, 2020.

(51) Int. Cl.
  *G06F 3/041* (2006.01)
  *G06F 3/044* (2006.01)
(52) U.S. Cl.
  CPC ........ *G06F 3/04166* (2019.05); *G06F 3/0446* (2019.05)

(58) Field of Classification Search
CPC .. G06F 3/04166; G06F 3/0446; G06F 3/0445; G06F 2203/04111
See application file for complete search history.

(56) References Cited

U.S. PATENT DOCUMENTS

| | | | |
|---|---|---|---|
| 2006/0158202 A1* | 7/2006 | Umeda | G06F 3/04182 324/686 |
| 2011/0042152 A1* | 2/2011 | Wu | G06F 3/04166 345/173 |
| 2015/0185899 A1* | 7/2015 | Lee | G06F 3/0445 345/174 |
| 2018/0364862 A1* | 12/2018 | Yang | G06F 3/04182 |

* cited by examiner

*Primary Examiner* — Robin J Mishler
(74) *Attorney, Agent, or Firm* — WPAT, PC

(57) ABSTRACT

A touch sensitive processing method, comprising: generating modified codes of N orthogonal pseudo random number (PN) codes, each of PN code has M symbols, where M and N are positive integers larger than 1; transmitting driving signals modulated by the N modified codes via N first electrodes, respectively, and sensing via multiple second electrodes in a M symbols period to generate M one-dimensional sensing information arrays; calculating sums of corresponding elements of the M one-dimensional sensing information arrays corresponding to each of the second electrodes, respectively; determining whether each of the sums is in a range; and recording the M one-dimensional sensing information arrays and their corresponding N first electrodes and N PN codes in response to that at least one of the sums is determined out of the range.

22 Claims, 13 Drawing Sheets

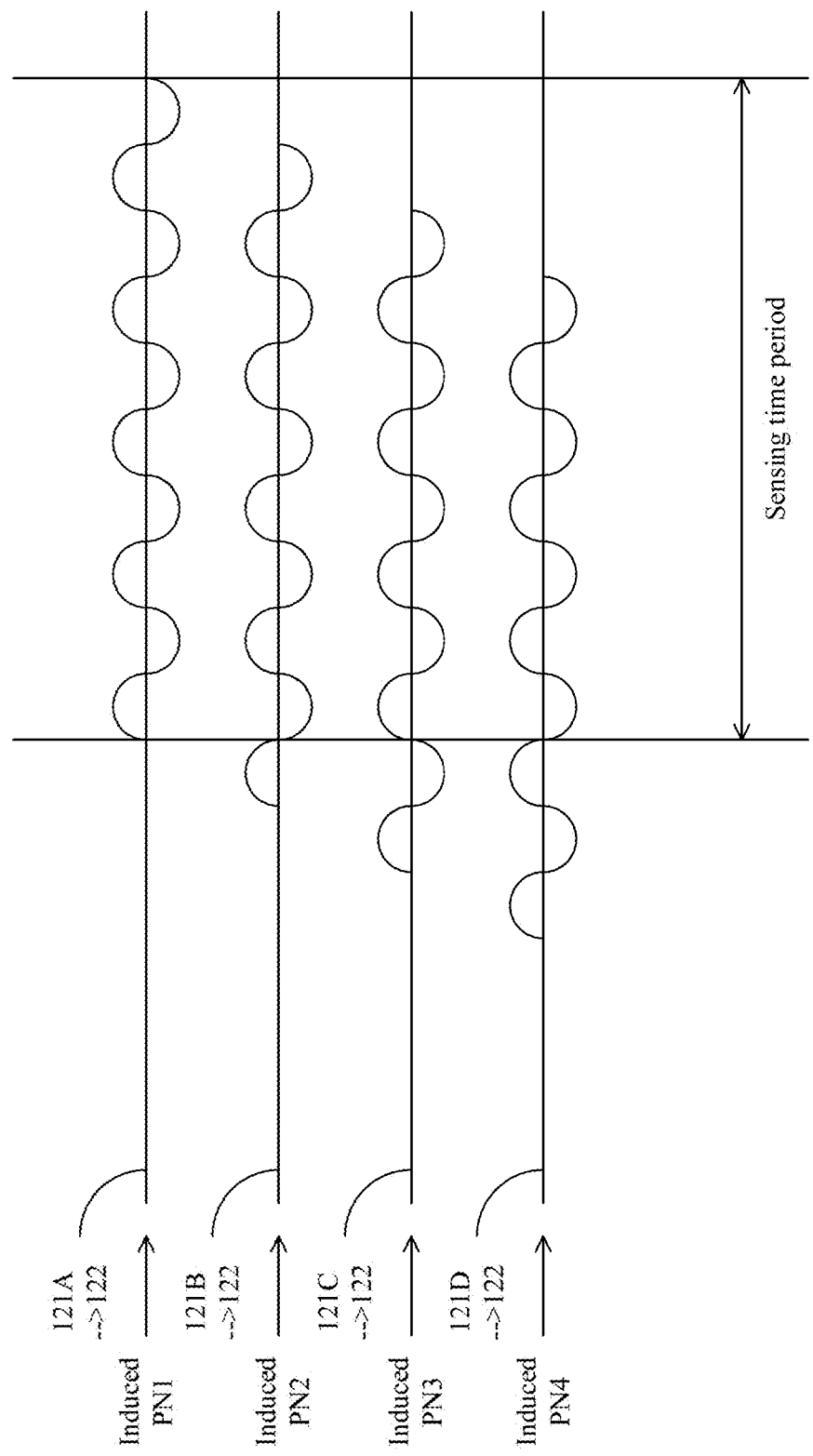

TOUCH SENSITIVE PROCESSING APPARATUS AND TOUCH SYSTEM AND TOUCH SENSITIVE PROCESSING METHOD THEREOF

CROSS REFERENCE TO RELATED PATENT APPLICATION

This patent application claims benefits of a provisional patent application No. 63/128,905 filed on Dec. 22, 2020.

FIELD OF THE INVENTION

The present invention relates to touch panel, and more particularly, to detect approaching or touching event via touch panel.

BACKGROUND OF THE INVENTION

Touch screen or touch panel is one of the most common input interfaces of modern electronic systems. When number of touch electrodes grows with size of touch screen, it is getting slow to scan external conductive objects on the touch screen. The present application intends to solve how to accelerate the scan speed in order to maintain or even increase report frequency of scan.

SUMMARY OF THE INVENTION

According to an embodiment of the present application, a touch sensitive processing method applicable to a touch panel is provided, the touch panel comprises multiple first electrodes in parallel to a first axis and multiple second electrodes in parallel to a second axis, each of the first electrodes intersect with the second electrodes to form multiple sensing areas but they are not electrically coupled, the touch sensitive processing method comprising: generating N orthogonal pseudo random number (PN) codes, wherein each of the PN codes is constituted of M symbols, where M and N are positive integers larger than 1; generating N modified codes according to the N PN codes, respectively; transmitting driving signals modulated by the N modified PN codes via N of the multiple first electrodes, respectively, and sensing in a period of M symbols via the second electrodes to generate M one-dimensional sensing information arrays; calculating sums of each of corresponding elements of the M one-dimensional sensing information arrays corresponding to the second electrodes, respectively; determining whether each of the sums is in a range; and recording the M one-dimensional sensing information arrays and the corresponding N first electrodes and the N PN codes in response to that at least one of the sums is determined out of the range.

Preferably, in order to detect in blocks, wherein the N first electrodes are adjacent, a first block of the touch panel comprises the N first electrodes.

Preferably, in order to prevent mistaking single one approaching/touching event as two events in two adjacent blocks, the touch sensitive processing method further comprise: transmitting driving signals modulated by the N modified codes via N first electrodes in a second block of the touch panel, respectively, and sensing in a period of M symbols via the second electrodes to generate M second one-dimensional sensing information arrays; calculating second sums of each of corresponding elements of the M second one-dimensional sensing information arrays corresponding to the second electrodes, respectively; determining whether each of the second sums is in a range; recording the M second one-dimensional sensing information arrays and the corresponding N first electrodes and the N PN codes in response to that at least one of the second sums is determined out of the range; and detecting an approaching or touching event near the two of N first electrodes according to the M one-dimensional sensing information arrays and the M second one-dimensional sensing information arrays, the two of N first electrodes and the N PN codes.

Preferably, in order to find out the location of touch event, the touch sensitive processing method further comprise detecting an approaching or touching event near the N first electrodes according to the M one-dimensional sensing information arrays, the N first electrodes and the N PN codes.

Preferably, in order to satisfy the balance property, wherein the modified code of the PN code is one of followings: the corresponding PN code with a prefix part, wherein the prefix part includes the last P symbols of the PN code, where P is a positive integer; the corresponding PN code with a suffix part, wherein the suffix part includes the first Q symbols of the PN code, where Q is a positive integer; and the corresponding PN code with the prefix part and the suffix part.

Preferably, in order to satisfy the balance property, wherein when M is an odd number, the range includes a sum of N logic symbol 1s.

According to an embodiment of the present application, a touch sensitive processing apparatus applicable to a touch panel is provided, the touch panel comprises multiple first electrodes in parallel to a first axis and multiple second electrodes in parallel to a second axis, each of the first electrodes intersect with the second electrodes to form multiple sensing areas but they are not electrically coupled, the touch sensitive processing apparatus comprising: an interconnection network connecting with the first and the second electrodes, respectively; a driving circuit connecting with the interconnection network; a sensing circuit connecting with the interconnection network; and a processor executing instructions stored in non-volatile memory for: generating N orthogonal pseudo random number (PN) codes, wherein each of the PN codes is constituted of M symbols, where M and N are positive integers larger than 1; generating N modified codes according to the N PN codes, respectively; having the driving circuit and the interconnection network for transmitting driving signals modulated by the N modified PN codes via N of the multiple first electrodes, respectively, and having the sensing circuit and the interconnection network sensing in a period of M symbols via the second electrodes to generate M one-dimensional sensing information arrays; calculating sums of each of corresponding elements of the M one-dimensional sensing information arrays corresponding to the second electrodes, respectively; determining whether each of the sums is in a range; and recording the M one-dimensional sensing information arrays and the corresponding N first electrodes and the N PN codes in response to that at least one of the sums is determined out of the range.

Preferably, in order to detect in blocks, wherein the N first electrodes are adjacent, a first block of the touch panel comprises the N first electrodes.

Preferably, in order to prevent mistaking single one approaching/touching event as two events in two adjacent blocks, the processor is further for: having the driving circuit and the interconnection network for transmitting driving signals modulated by the N modified codes via N first electrodes in a second block of the touch panel, respectively, and having the sensing circuit and the interconnection network for sensing in a period of M symbols via the second electrodes to generate M second one-dimensional sensing information arrays; calculating second sums of each of corresponding elements of the M second one-dimensional sensing information arrays corresponding to the second electrodes, respectively; determining whether each of the second sums is in a range; recording the M second one-dimensional sensing information arrays and the corresponding N first electrodes and the N PN codes in response to that at least one of the second sums is determined out of the range; and detecting an approaching or touching event near the two of N first electrodes according to the M one-dimensional sensing information arrays and the M second one-dimensional sensing information arrays, the two of N first electrodes and the N PN codes.

Preferably, in order to find out the location of touch event, the processor is further for detecting an approaching or touching event near the N first electrodes according to the M one-dimensional sensing information arrays, the N first electrodes and the N PN codes.

Preferably, in order to report events to a host, wherein the touch sensitive processing apparatus further comprises an interface module connecting with a host, the processor is further for having the interface module to report the detected approaching or touching event to the host.

Preferably, in order to satisfy the balance property, wherein the modified code of the PN code is one of followings: the corresponding PN code with a prefix part, wherein the prefix part includes the last P symbols of the PN code, where P is a positive integer; the corresponding PN code with a suffix part, wherein the suffix part includes the first Q symbols of the PN code, where Q is a positive integer; and the corresponding PN code with the prefix part and the suffix part.

Preferably, in order to satisfy the balance property, wherein when M is an odd number, the range includes a sum of N logic symbol 1s.

According to an embodiment of the present application, a touch system is provided. The touch system comprises the touch sensitive processing apparatus and the touch panel.

According to an embodiment of the present application, a touch system is provided. The touch system comprises the touch sensitive processing apparatus, the touch panel and the host.

The touch sensitive processing apparatus, the touch system and the touch sensitive processing method thereof take advantages of the balance property. Thus it may use less computational resources or time to determine whether an approaching or touching event occurs in a block of the touch panel. Except for the anti-interference characteristics contributed by the PN codes, it further accelerates the detection of the approaching or touching event and decreases waste of computational resources.

BRIEF DESCRIPTION OF THE DRAWINGS

The advantages and spirit related to the present invention can be further understood via the following detailed description and drawings.

FIG. 4B depicts a timing diagram with regard to driving signals induced by one sensing electrode in accordance with another embodiment of the present application.

DETAILED DESCRIPTION OF THE PREFERRED EMBODIMENT

Figure 1:
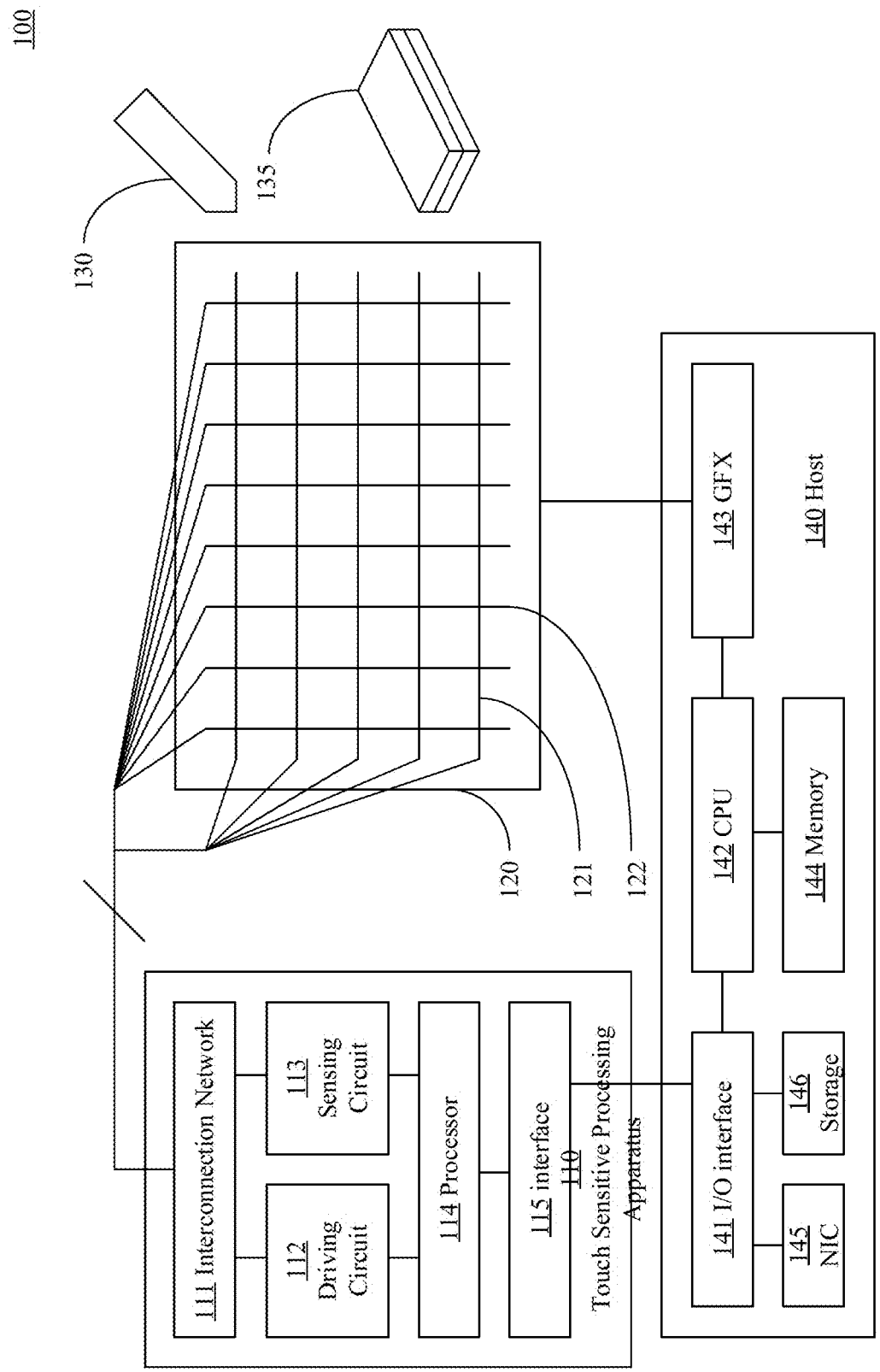
FIG. 1 shows a block diagram of a touch system according to an embodiment of the present invention.

Some embodiments of the present application are described in detail below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Please refer to FIG. 1, which shows a block diagram of a touch system 100 according to an embodiment of the present invention. The touch system 100 may be a computer system such as a desktop computer, a laptop computer, a tablet computer, an industrial control computer, a smartphone or any other kinds of computer having touch sensitive function.

The touch system 100 may comprise a touch sensitive processing apparatus 110, a touch panel or screen 120 coupled to the touch sensitive processing apparatus 110, and a host coupled to the touch sensitive processing apparatus 110. The touch system 100 may further comprises one or more styli 130 and/or touch board eraser 135. Hereinafter the touch panel or screen 120 is referred as the touch screen 120. However, in the embodiments lacking of display function, persons having ordinary skill in the art can understand the touch screen denoted in the present application may be referred to a touch panel.

The touch screen 120 may comprise multiple first electrodes 121 in parallel to a first axis and multiple second electrodes 122 in parallel to a second axis. The first electrodes 121 may intersect with the second electrodes 122 in order to form multiple sensing points or sensing areas. Equivalently, the second electrodes 122 may intersect with the first electrodes 121 in order to form multiple sensing points or sensing areas. In some embodiments of the present application, the first electrodes 121 may be referred as first touch electrodes 121 and the second electrodes 122 may be referred as second touch electrodes 122. The first electrodes 121 and the second electrodes 122 may be collectively referred as touch electrodes. In some embodiments with touch screens 120, the first electrodes 121 and the second electrodes 122 are made by transparent material. The first electrodes 121 and the second electrodes 122 may be disposed in one electrode layer. Conductive plates of each one of the first electrodes 121 or the second electrodes 122 may be connected by bridging. The first electrodes 121 and the second electrodes 122 may be disposed at different overlapping electrode layers. Unless described specifically, the present application may be applied to the embodiments having one or more electrode layers. The first axis and the second axis are perpendicular in most cases. However, the present application does not limit that the first axis and the second axis are perpendicular. In one embodiment, the first axis may be a horizontal axis or a pixel refreshing axis of the touch screen 120.

The touch sensitive processing apparatus 110 as shown in FIG. 1 may comprise following hardware circuit: an interconnection network module 111, a driving circuit module 112, a sensing circuit module 113, a processor module 114, and an interface module 115. The touch sensitive processing apparatus 110 may be implemented inside a single integrated circuit which may include one or more chips. It may use multiple integrated circuits and an interconnected circuit board carried the multiple integrated circuits to realize the touch sensitive processing apparatus 110. The touch sensitive processing apparatus 100 may be implemented in single integrated circuits with the host 140. The present application does not limit how to implement the touch sensitive processing apparatus 110.

The interconnection network module 111 is configured to connect each of the multiple first electrodes 121 and/or the multiple second electrodes 122 of the touch screen 120. The interconnection network module 111 may follow control command of the processor module 114 for connecting the driving circuit module 112 and any one or more touch electrodes and for connecting the sensing circuit module 113 and any one or more touch electrodes. The interconnection network module 111 may include a combination of one or more multiplexers (MUX) to realize the aforementioned functions.

The driving circuit module 112 may comprise clock generator, frequency divider, frequency multiplier, phase lock loop, power amplifier, DC-DC voltage converter, regulator and/or filter, which is configured to provide driving signal to any one or more touch electrodes via the interconnection network module 111 according to control commands of the processor module 114. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit module 112 may include one or more channel. Each channel may be connected to any one or more touch electrodes via the interconnection network module 111.

The sensing circuit module 113 may comprise integrator, sampler, clock generator, frequency divider, frequency multiplier, phase lock loop, power amplifier, DC-DC voltage converter, regulator and/or filter, which is configured to sense on any one or more touch electrodes via the interconnection network module 111 according to control commands of the processor module 114. When the touch signal is transmitted from one of the touch electrodes, another touch electrode may induce the touch signal. And the sensing circuit module 130 may demodulate the induced touch signal by the another touch electrode in accordance with the modulation method performed on the driving signal by the driving circuit module 112 in order to restore the messages carried by the driving signal. The sensing circuit module 113 may include one or more channels. Each channel may be connected to any one or more touch electrodes via the interconnection network module 111. In the same time, each channel may simultaneously perform sensing and demodulation.

In one embodiment, the driving circuit module 112 and the sensing circuit module 113 may include analog front-end (AFE) circuits. In another embodiment, in additional to the AFE circuits, the driving circuit module 112 and the sensing circuit module 313 may include digital back-end (DBE) circuits. If the driving circuit module 112 and the sensing circuit module 113 include only the AFE circuits, the DBE circuits may be implemented in the processor module 114.

The processor module 114 may include a digital signal processor for connecting the AFE circuits or the DBE circuits of the driving circuit module 112 and the sensing circuit module 113, respectively. The processor module 114 may include an embedded processor, non-volatile memories and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 111, the driving circuit module 112, the sensing circuit module 113 and the interface module 115 of the touch sensitive processing apparatus 110. For examples, the processor 114 may comprises processors widely adopted in the industry such as 8051 series, Intel i960 series, ARM Cortex-M series and etc. The present application does not limit types and numbers of processor cores included in the processor module 114.

The instructions and data may be used to implement each of steps mentioned in the present application and flows and methods constructed by the steps. Some instructions may be executed independently inside the processor module 114, for examples, arithmetic and log operation instructions. Other instructions may be used to control other circuits of the touch sensitive processing apparatus 110. These instructions may include input/output interfaces of the processor module 114 to control other circuits. Other circuits may provide information via the input/output interface of the processor module 114 to the OS and/or application programs executed by the processor module 114. Persons having ordinary skill in the art should have common knowledge of computer organization and architecture which enabling them to understand that the flows and methods provided by the present application can be realized by the circuits and the instructions.

The interface module 115 may include kinds of serial or parallel bus, such as universal serial bus (USB), I²C, peripheral component interconnect (PCI), PCI-Express, IEEE 1394 and other industrial standard input/output interface. The touch sensitive processing apparatus 110 connects to the host 140 via the interface module 115.

The touch system 100 may comprise one or more styli 130 and/or touch board erasers 135. The stylus 130 and touch board eraser 135 may be transmitters which emit electrical signals. The transmitters may include active transmitter which actively emits electrical signals or passive transmitters which emit electrical signals in response to external electrical signals. The stylus 130 and touch board eraser 135 may comprise one or more electrodes which is configured to receive electrical signals from the touch screen 120 synchronously or asynchronously, or to transmit electrical signals to the touch screen 120 synchronously or asynchronously. The electrical signals may be modulated according to one or more of the aforementioned modulation methods.

The stylus 130 or touch board eraser 135 may be conductor which is configured to transmit driving signals or to be grounded via user's hand or body. The stylus 130 or touch board eraser 135 may be physically or wirelessly connected to an I/O interface 141 of the host 140 or any other interfacing circuits of the I/O interface 141.

The touch sensitive processing apparatus 110 may detect one or more external objects 139 such as fingers, palms or passive styli 130 or touch board erasers 135, or active styli 130 or touch board erasers 135 emitting electrical signals via the touch screen 120. The touch sensitive processing apparatus 110 may utilize mutual-capacitance sensing or self-capacitance sensing to detect external conductive objects. The styli 130 or touch board erasers 135 and touch sensitive processing apparatus 110 may use the aforementioned modulation and demodulation methods to transmit message via the electrical signals. The touch sensitive processing apparatus 110 may detect one or more positions where the styli 130 or touch board erasers 135 touch or approach the touch screen 120, status or sensors (pressure sensor or button) onboard the stylus 130 or touch board eraser 135, orientation angle or inclination angle of the stylus 130 or touch board eraser 135 with respect to the touch screen 120, and etc. according to the electrical signals.

The host 140 is a main apparatus for controlling the touch system 100. It may comprise an input/output interface module 141 for connecting the interface module 115, a central processing unit (CPU) module 142, a graphics processor module 143, a memory module 144 connects to the CPU module 142, a network interface module 145 and a storage 146 module connect to the input/output interface module 141.

The CPU module 142 may directly or indirectly connects to the input/output interface module 141, the graphics processor module 143, the memory module 144, the network interface module 145 and the storage module 146. The CPU module 142 may comprise one or more processor or processor cores. Common processors may include Intel, AMD, VIA's x86 and x64 instruction set architecture (ISA) processors, Apple, Qualcomm, MediaTek's ARM ISA processors, or any other types of complex instruction set computer (CISC) or reduced instruction set computer (RISC) processors. The OS and application programs include multiple instructions and data corresponding to the instruction set. By executing these instructions, the CPU module 142 is able to control other circuits of the touch system 100.

The storage module 146 comprises non-volatile memory. Common examples are hard disks, electronic erasable rewritable read only memory (EEPROM), or flash memory. The storage module 146 may store normal operating system and application programs executable under the operating system. The network interface module 145 may comprise wired or wireless hardware network interface. The network interface module 145 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The optional graphics processor (GPU) module 143 is usually configured to handle computations with respect to graphics outputs. The graphics processor module 143 may connect to the touch screen 120 for controlling outputs of the touch screen 120. In some applications, the host 140 may have the CPU module 142 execute the computations with respect to graphics outputs, without dedicated handling of the graphics processor module 143.

The host 140 may comprise components or apparatus not shown in FIG. 1, for example, audio input/output interface, keyboard input interface, mouse input interface, track-ball input interface and/or any other hardware circuits. Persons having ordinary skill in the art should have common knowledge of computer organization and architecture. They can understand the touch system 100 disclosed by the present application is exemplary. Parts regarding to the inventive feature provided by the present application should be referred to the specification and the claim.

Figure 2:
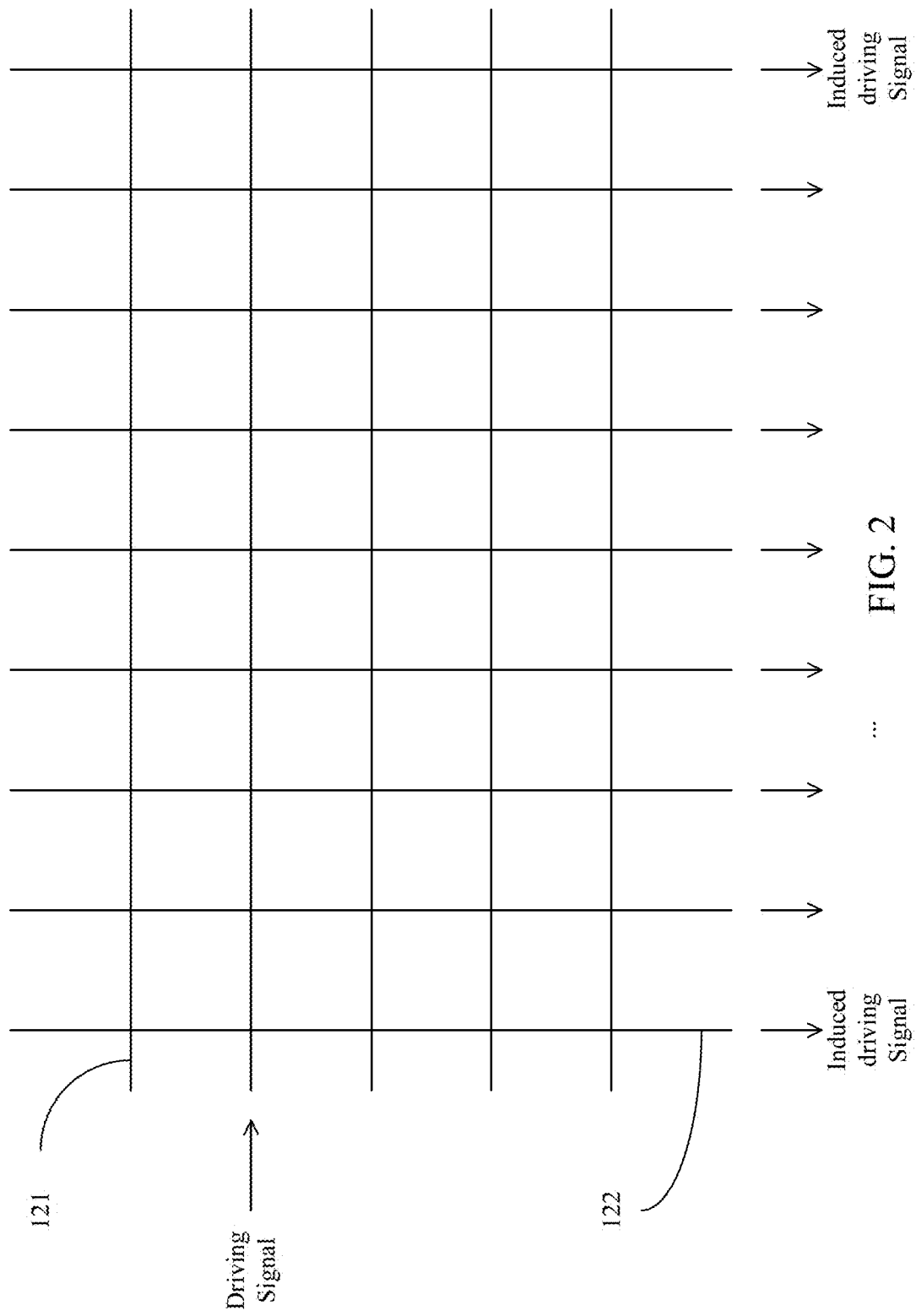
FIG. 2 illustrates a touch screen in accordance with an embodiment of the present application.

Please refer to FIG. 2, which illustrates a touch screen in accordance with an embodiment of the present application. The touch screen 120 may include first electrodes 121 in parallel to a first axis and second electrodes 122 in parallel to a second axis.

In a mutual capacitance sensing method, the driving circuit module 112 provides driving signals to one of the first electrodes 121 in a time division manner. While the driving signals being provided, the sensing circuit module 113 is commanded to sense all of the second electrodes 122 in order to get one-dimensional sensing information. Each of the one-dimensional sensing information includes sensing results corresponding to each one of the second electrodes 122. Two-dimensional sensing information or a sensing image can be composed by the one-dimensional sensing information according to positions of their corresponding first electrodes 121 emitting the driving signals. According to the two-dimensional sensing information or the sensing image, the processor module 114 can detect whether there is one or more external conductive objects approaching the touch screen 120.

Hence, assuming there are X first electrodes, a complete sensing image should be composed by X one-dimensional sensing information. In other words, it takes X times of driving and sensing to scan entire touch screen 120 once. When the size of the touch screen 120 grows, the number X would also increase while maintaining detection precision. It costs more time to scan the whole touch screen once.

And during the detection, driving signals emitted from one specified first electrodes 121 induced by different second electrodes 122 in different time. As shown in FIG. 2, when the driving signals being propagated from left end of the first electrodes 121, the driving signals are first induced by the most left second electrodes 122 and the induction time corresponding to the most right second electrodes 122 is the latest. The induced driving signals would be propagated to the sensing circuit module 113 from bottom ends of all the second electrodes 122, respectively. If the sensing circuit module 113 performs sensing via all of the second electrodes 122 in the same time, propagations of the induced driving signals show their timing order in the one-dimensional sensing information.

Besides, the first electrodes 121 and the second electrodes 122 of the touch screen 120 may be manufactured with errors and defects. When widths of the electrodes are varied, the propagations of the induced driving signals may be non-linear. In other words, the driving signals propagates along with a shorter defect electrode may not arrive the sensing circuit module 113 earlier than those driving signals propagates along with a longer normal electrode.

Figure 3:
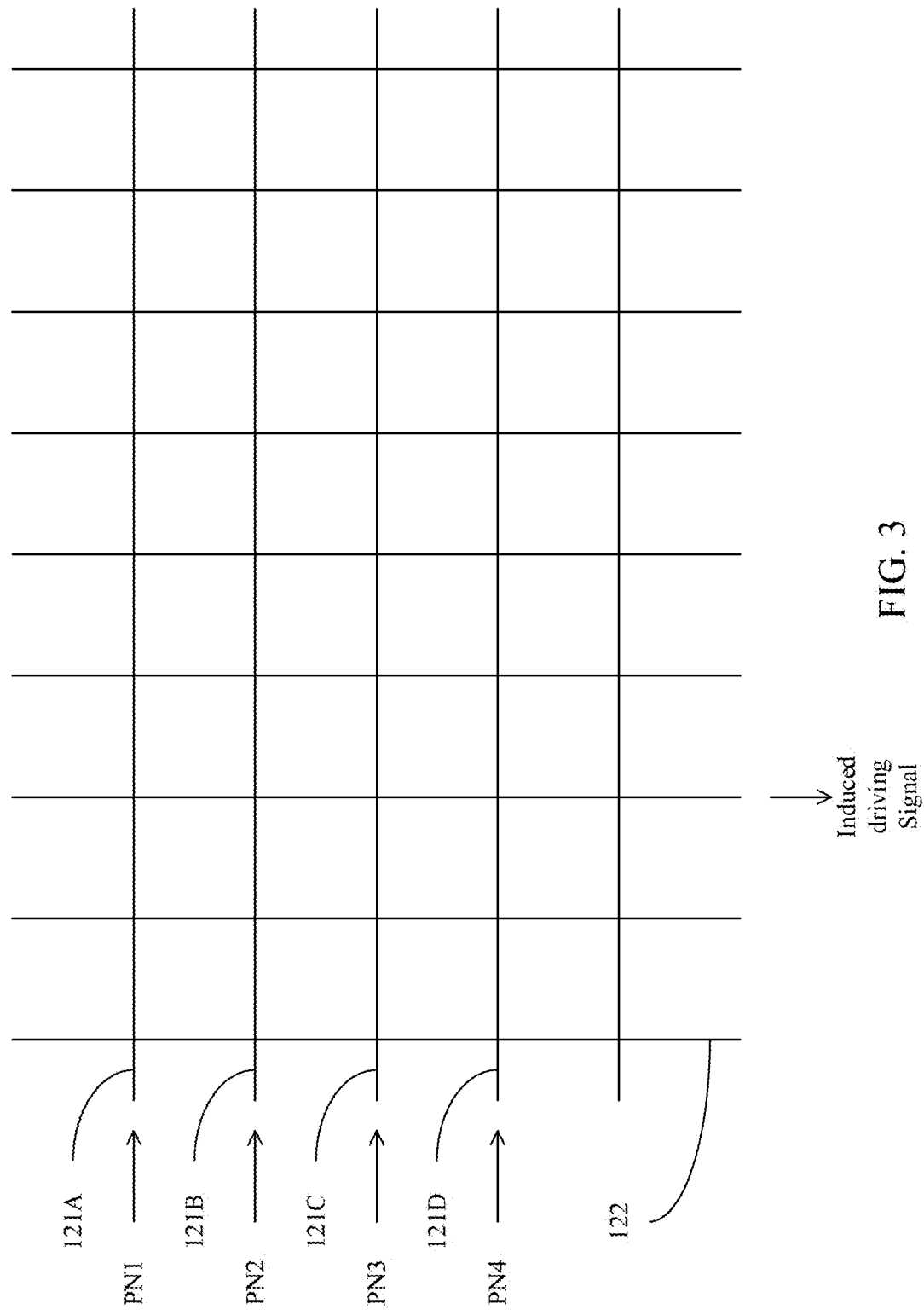
FIG. 3 depicts driving signals propagations in accordance with an embodiment of the present application.

Please refer to FIG. 3, which depicts driving signals propagations in accordance with an embodiment of the present application. In the embodiment as shown in FIG. 3, the touch sensitive processing apparatus 110 may simultaneously transmit modulated driving signals to N first electrodes 121. For example, different driving signals are provided to four adjacent first electrodes 121A~121D, respectively. These driving signals may be different pseudo random number codes or pseudo noise codes.

The processor module 114 may utilize software or hardware to generate these pseudo random number codes. For example, LFSR (Linear Feedback Shift Register) circuit may be used to generate multiple pseudo random number codes. Each the pseudo random number code may include M symbols. In an example, a LFSR circuit with four delay registers may generate pseudo random number codes with a maximum length of 15 symbols, i.e., M is 15. Each logic symbol may have two possible states, i.e., logic symbol 1 and logic symbol 0. The logic symbol 1 may be modulated as signal −1; the logic symbol 0 may be modulated as signal 1.

One characteristics of the pseudo random number code is that the numbers of the logic symbol 1 and the logic symbol 0 are almost the same. Take an example, a first pseudo random number code PN1 may include following 15 logic symbols, 1, 1, 1, 1, 0, 0, 0, 1, 0, 0, 1, 1, 0, 1, 0. It can be converted into modulated signals, −1, −1, −1, −1, 1, 1, 1, −1, 1, 1, −1, −1, 1, −1, 1. A sum of all of the modulated signals is −1, i.e., logic symbol 1. Take a second example, a second pseudo random number code PN2 may include following 15 logic symbols, 1, 0, 0, 1, 1, 0, 1, 0, 1, 1, 1, 1, 0, 0, 0. It can be converted into modulated signals, −1, 1, 1, −1, −1, 1, −1, 1, −1, −1, −1, −1, 1, 1, 1. A sum of all of the modulated signals is −1, i.e., logic symbol 1.

In the embodiment as shown in FIG. 3, when the sensing circuit module 113 senses the induced driving signals of a second electrode 122, it gets a sum of N pseudo random number codes at every timing point corresponding to the 15 symbols, respectively. A total sum can be calculated according to the sums corresponding to the 15 timing points. The total sum should be N times of logic symbol 1. If there is no external conductive object approaching or touching the touch screen 120, the quotient of the total sum of sums corresponding to M timing points divides N can be demodulated as the logic symbol 1. In other words, in case the logic symbol 1 is demodulated, it means no approaching or touching event of external conductive object happened around the intersections of N first electrodes 121 and the second electrode 122.

Person having ordinary skill in the art can understand different pseudo random number codes may have odd-number or even-number symbols. With regard to a pseudo random number code with even-number symbols, numbers of logic symbol 1 and logic symbol 0 should be identical. With regard to a pseudo random number code with odd-number symbols, a difference of numbers of logic symbol 1 and logic symbol 0 should be 1. However, if there exist some interference or errors occur during the propagations, a difference between the numbers of logic symbol 1 and logic symbol 0 may be fallen within a range. This particular characteristic of the pseudo random number code with maximum length sequence is named after "balanced property". In case there are $2^n$ symbols, there should be $2^{n-1}$ logic symbol 1 and $2^{n-1}$ virtual symbol 0. In case there are $2^n+1$ symbols, there should be $2^{n-1}$ logic symbols 1 and $2^{n-1}$ logic symbols 0, or $2^{n-1}$ logic symbols 1 and $2^{n-1}+1$ virtual symbols 0.

Already mentioned in the embodiment as shown in FIG. 2, lengths of propagation paths of the driving signals through different second electrodes 122 are not identical. It is understandable that lengths of propagation paths of the driving signals through different first electrodes 121 are not identical.

Figure 4A:
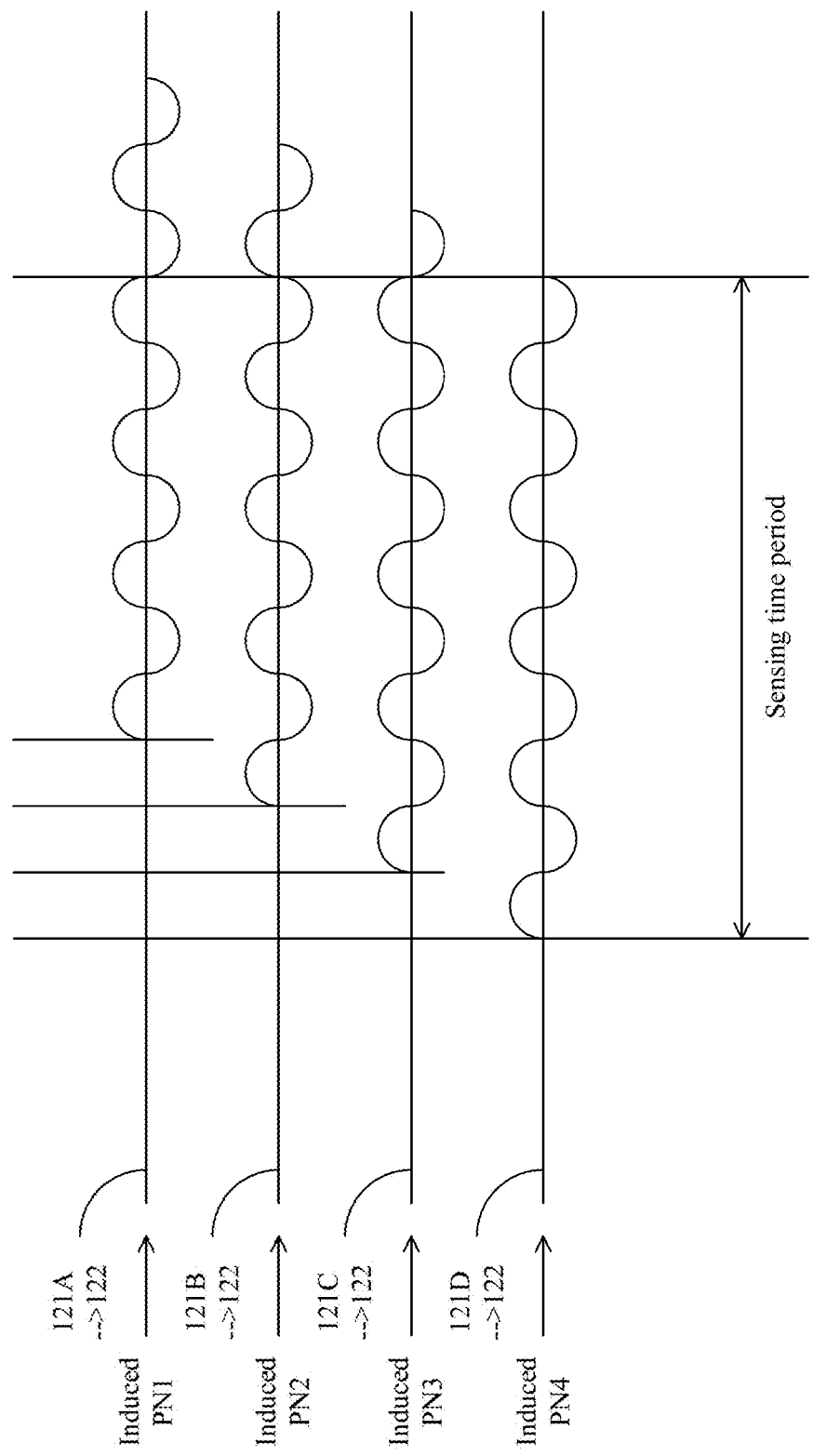
FIG. 4A depicts a timing diagram with regard to driving signals induced by one sensing electrode in accordance with an embodiment of the present application.

Please refer to FIG. 4A, which depicts a timing diagram with regard to driving signals induced by one sensing electrode in accordance with an embodiment of the present application. When N first electrodes 121 simultaneously transmit driving signals modulated by different pseudo random number codes, the fourth pseudo random number code PN4 which is closest to bottom of the touch screen 120 arrives the sensing circuit module 113 firstly, the first pseudo random number code PN1 which is closest to top of the touch screen 120 arrives the sensing circuit module 113 at last. Since distances between any given adjacent first electrodes 121 are identical, time delays between driving signals propagated along with any given adjacent first electrodes 121 should be identical, too.

In case the sensing circuit module 113 takes the timing of driving signals emitted by the first electrode 121D as the basis of timing to sense in a sensing time period of M symbols, when last symbols of driving signals emitted by the first electrodes 121A~121C arrive the sensing circuit module 113, the sensing time period is already ended. When the fourth random number code being sensed at the beginning, leading symbols of driving signals emitted by the first electrodes 121A~121C do not arrive the sensing circuit module 113 yet. If applying the aforementioned algorithm under circumstances that the four driving signals are not all presented, it would produce unpredictable error to calculate the total sum of sums corresponding to sensed symbols and to determine whether it is corresponding to N times of logic symbol 1.

Please refer to FIG. 4B, which depicts another timing diagram with regard to driving signals induced by one sensing electrode in accordance with another embodiment of the present application. Comparing with the embodiment as shown in FIG. 4A, the sensing circuit module 113 takes the timing of driving signals emitted by the first electrode 121A as the basis of timing to sense in a sensing time period of M symbols. When the last symbol of driving signals emitted by the first electrodes 121A being sensed, the second through the fourth pseudo random number codes PN2~PN4 are already gone. If applying the aforementioned algorithm under circumstances that the four driving signals are not all presented, it would produce unpredictable error to calculate the total sum of sums corresponding to sensed symbols and to determine whether it is corresponding to N times of logic symbol 1.

Figure 5A:
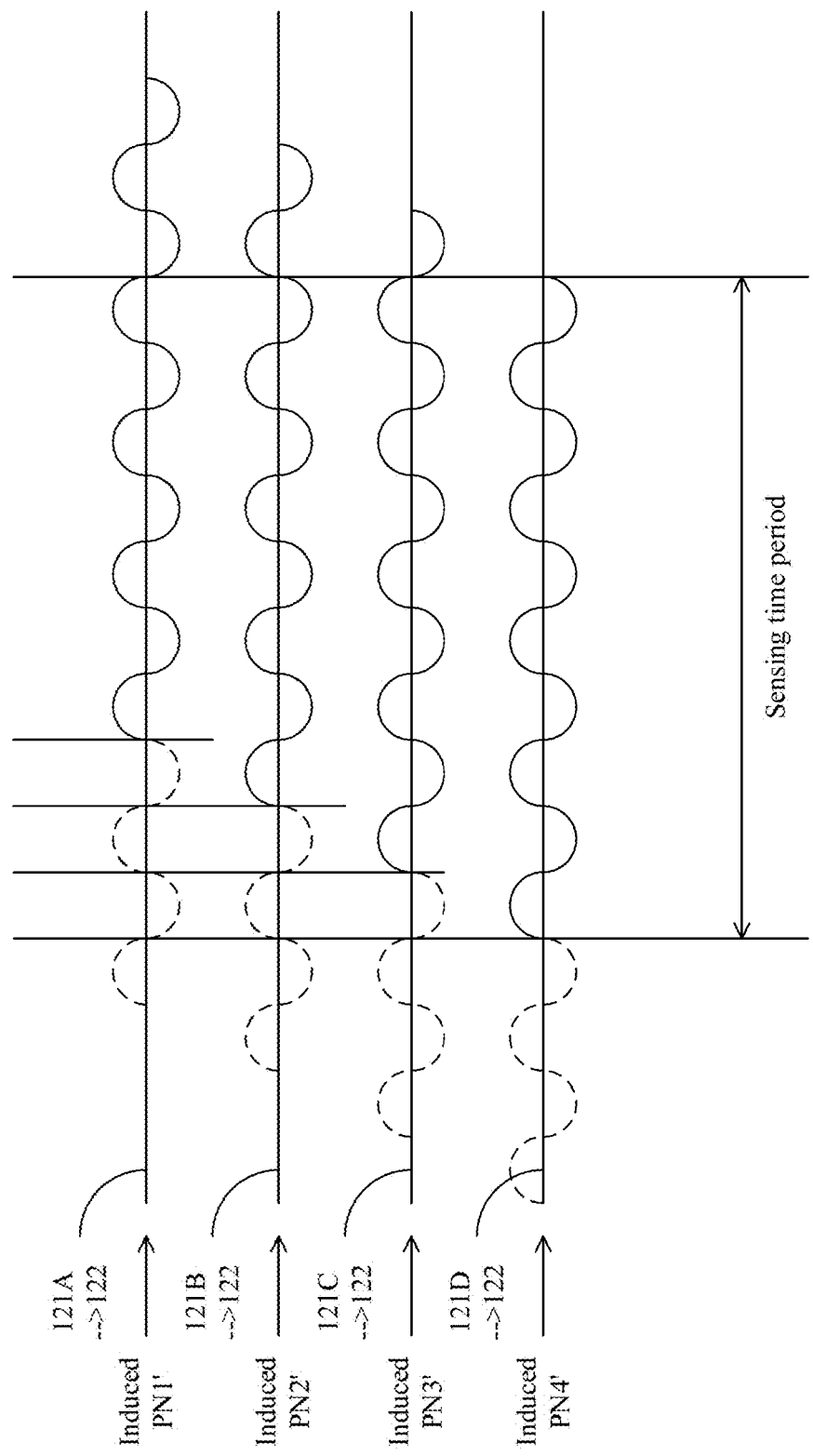
FIG. 5A shows a timing diagram of with regard to driving signals induced by one sensing electrode in accordance with an improved version of the embodiment as shown in FIG. 4A.

Please refer to FIG. 5A, which shows a timing diagram of with regard to driving signals induced by one sensing electrode in accordance with an improved version of the embodiment as shown in FIG. 4A. Both the sensing circuit module 113 as shown in FIGS. 4A and 5A use the same timing point and length of sensing time period to sense M symbols. However, in the embodiment as shown in FIG. 5A, the first through the fourth pseudo random number codes PN1'~PN4' emitted from the first electrodes 121A~121D include P+M symbols, respectively. The processor module 114 takes the last P symbols of the original M symbols as a prefix part to add them before the original M symbols in order to generate the pseudo random number codes. Hence, when the sensing circuit module 113 begins to sense, in addition to sense the M symbols of the original fourth pseudo random number code PN4, parts of P symbols of the first through the third pseudo random number codes PN1'~PN3' can be also sensed. Since the first P symbols are identical to the last P symbols, when no external conductive object approaching or touching corresponding position of the touch screen, the total sum of sensed symbols would be corresponding to N times of logic symbol 1 according to the aforementioned algorithm.

Figure 5B:
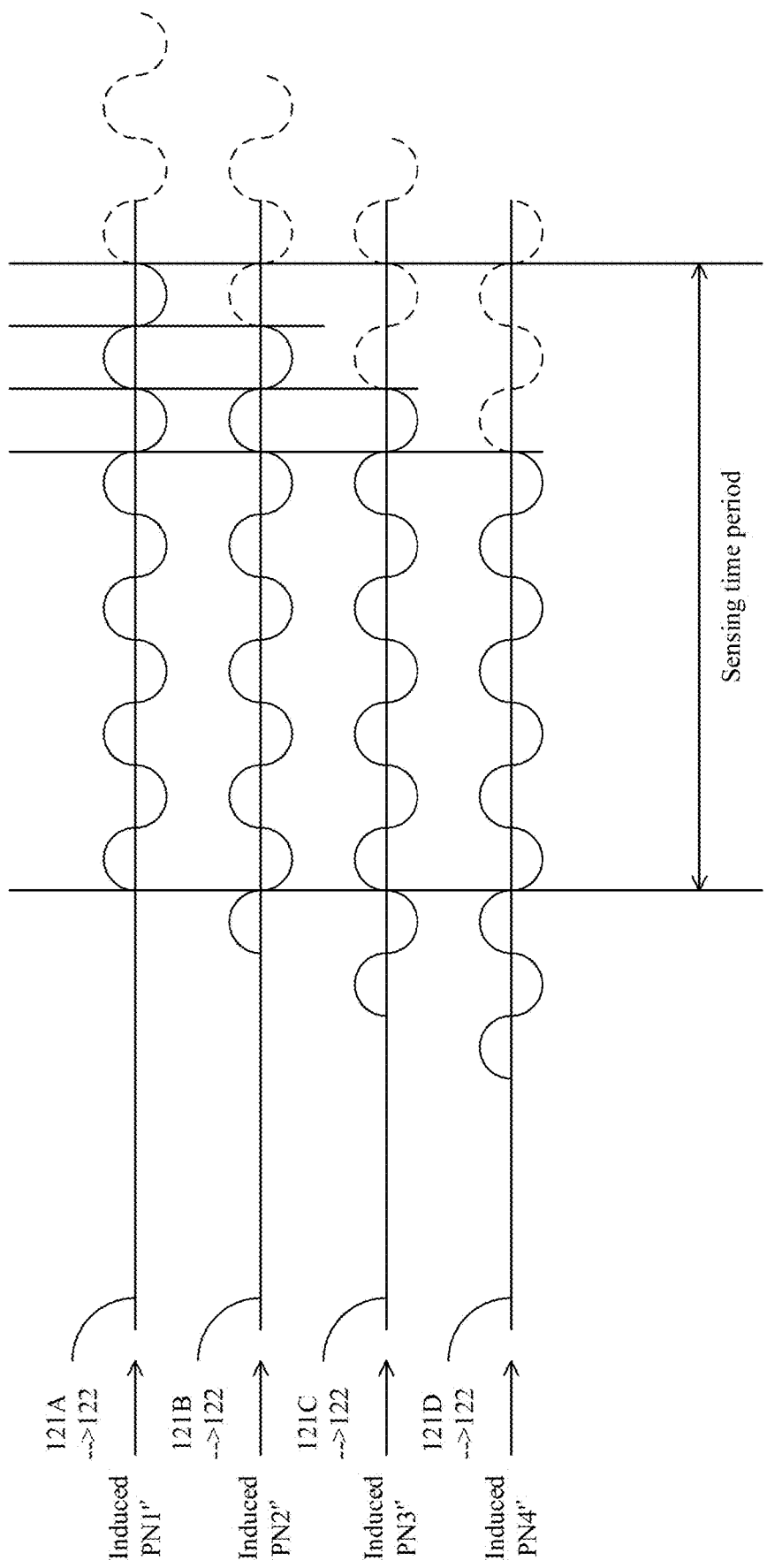
FIG. 5B shows a timing diagram of with regard to driving signals induced by one sensing electrode in accordance with an improved version of the embodiment as shown in FIG. 4B.

Please refer to FIG. 5B, which shows a timing diagram of with regard to driving signals induced by one sensing electrode in accordance with an improved version of the embodiment as shown in FIG. 4B. Both the sensing circuit module 113 as shown in FIGS. 4B and 5B use the same timing point and length of sensing time period to sense M symbols. However, in the embodiment as shown in FIG. 5B, the first through the fourth pseudo random number codes PN1"~PN4" emitted from the first electrodes 121A~121D include M+Q symbols, respectively. The processor module 114 takes the first Q symbols of the original M symbols as a suffix part to add them after the original M symbols in order to generate the pseudo random number codes. Hence, when the sensing circuit module 113 in the end of the sensing time period, in addition to sense the M symbols of the original first pseudo random number code PN1, parts of Q symbols of the second through the fourth pseudo random number codes PN2"~PN4" can be also sensed. Since the first Q symbols are identical to the last Q symbols, when no external conductive object approaching or touching corresponding position of the touch screen, the total sum of sensed symbols would be corresponding to N times of logic symbol 1 according to the aforementioned algorithm.

Figure 5C:
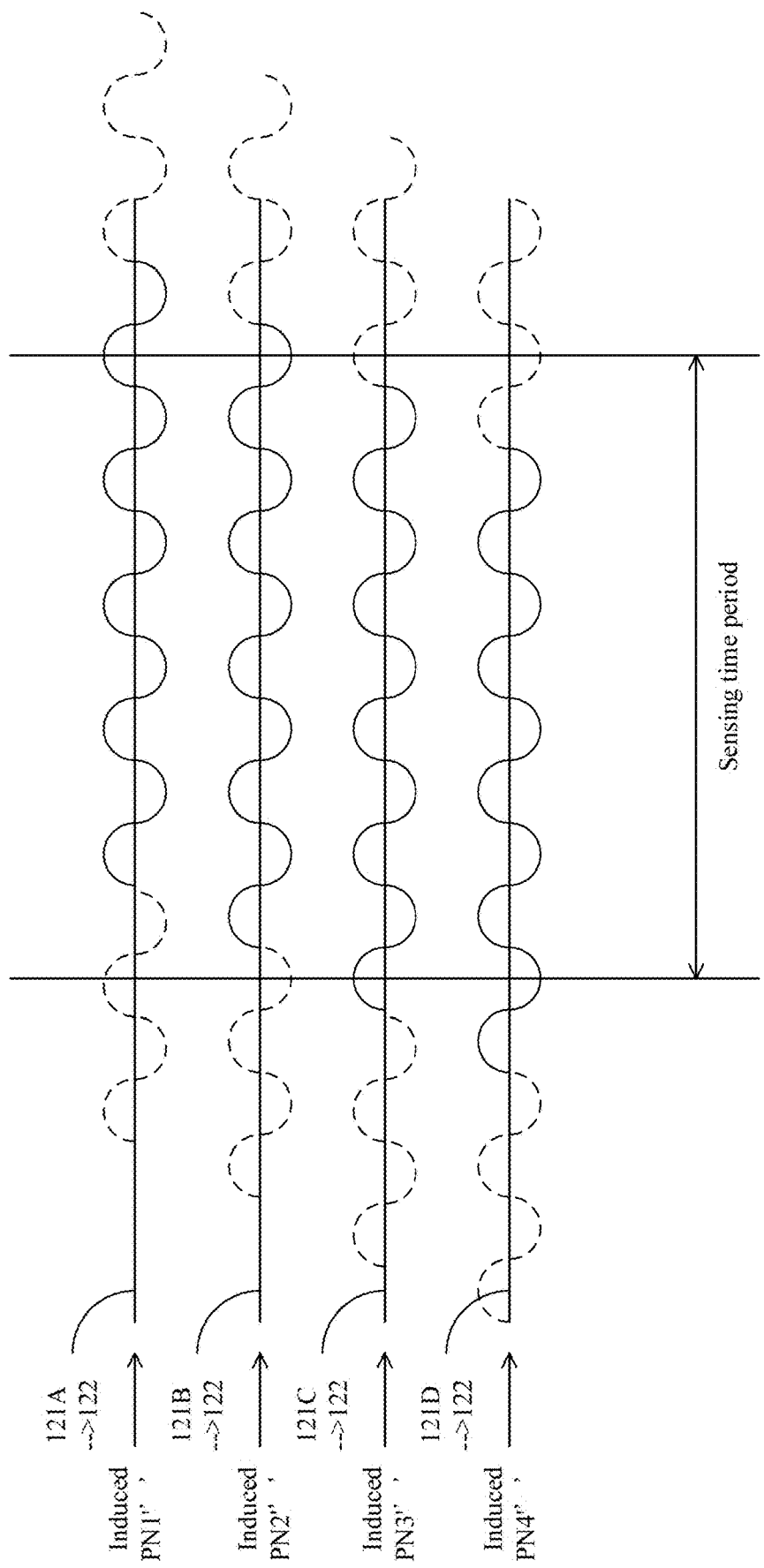
FIG. 5C shows a timing diagram of with regard to driving signals induced by one sensing electrode in accordance with an embodiment of the present invention.

Please refer to FIG. 5C, which shows a timing diagram of with regard to driving signals induced by one sensing electrode in accordance with an embodiment of the present invention. Comparing with the embodiments as shown in FIGS. 5A and 5B, the driving signals in the embodiment as shown in FIG. 5C have the prefix part and the suffix part, the sensing circuit module 113 does not align with the earliest or the latest pseudo random number codes. During the sensing time period of M symbols, the prefix parts of the first pseudo random number code PN1''' and the second pseudo random number code PN2''' and the suffix parts of the third pseudo random number code PN3''' and the fourth pseudo random number code PN4''' are included. When no external conductive object approaches or touches corresponding position of the touch screen, the total sum of sensed symbols would be corresponding to N times of logic symbol 1 according to the aforementioned algorithm.

Figure 6A:
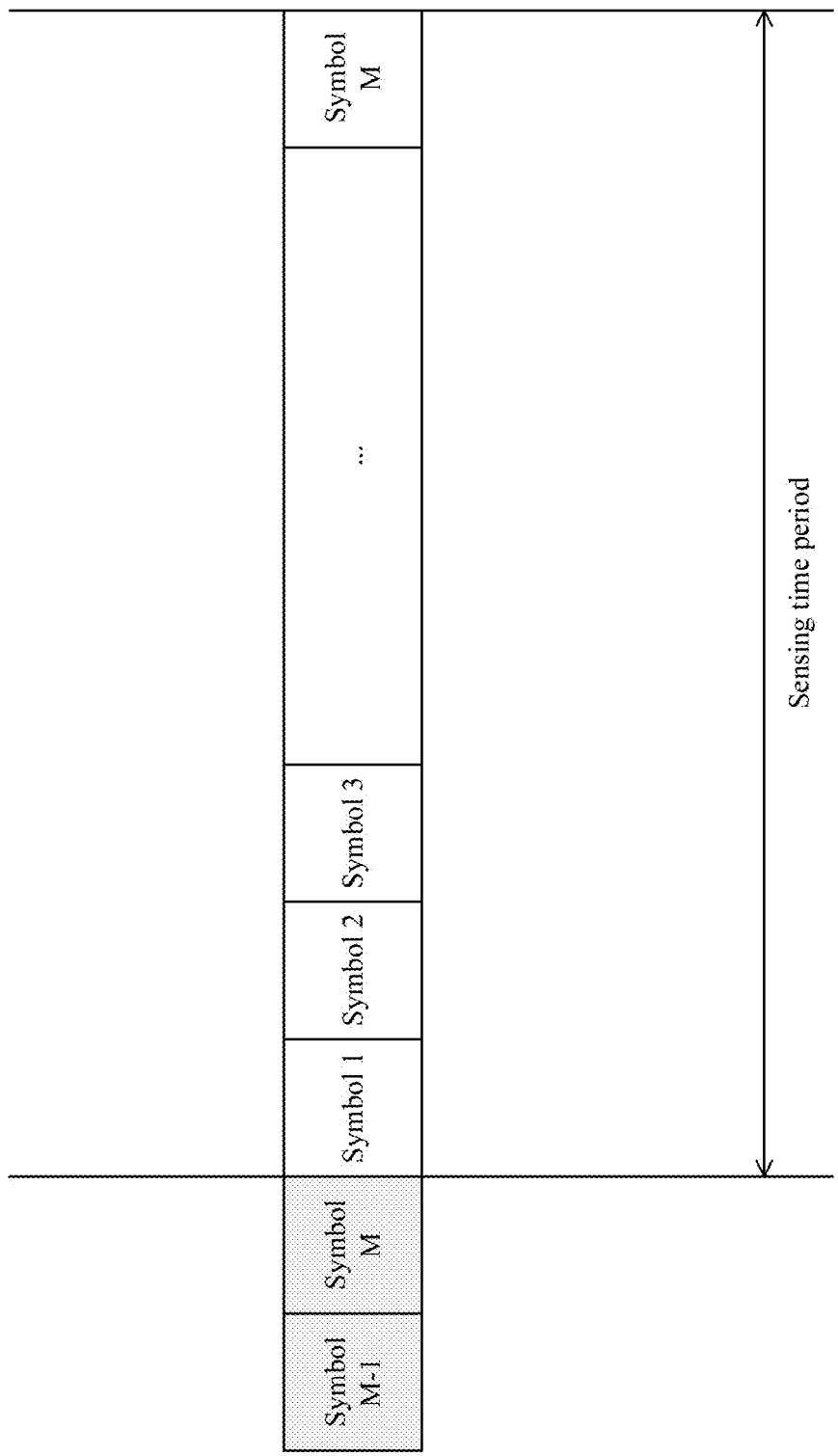
FIG. 6A depicts a diagram of a pseudo random number code in accordance with an embodiment of the present invention.

Please refer to FIG. 6A, which depicts a diagram of a pseudo random number code in accordance with an embodiment of the present invention. The original pseudo random number code includes M symbols (Symbol 1 through Symbol M). A prefix part can be added before the M symbols. In case P is 2, the prefix part includes two symbols. The first one is Symbol (M−1). And the second one is Symbol M.

Figure 6B:
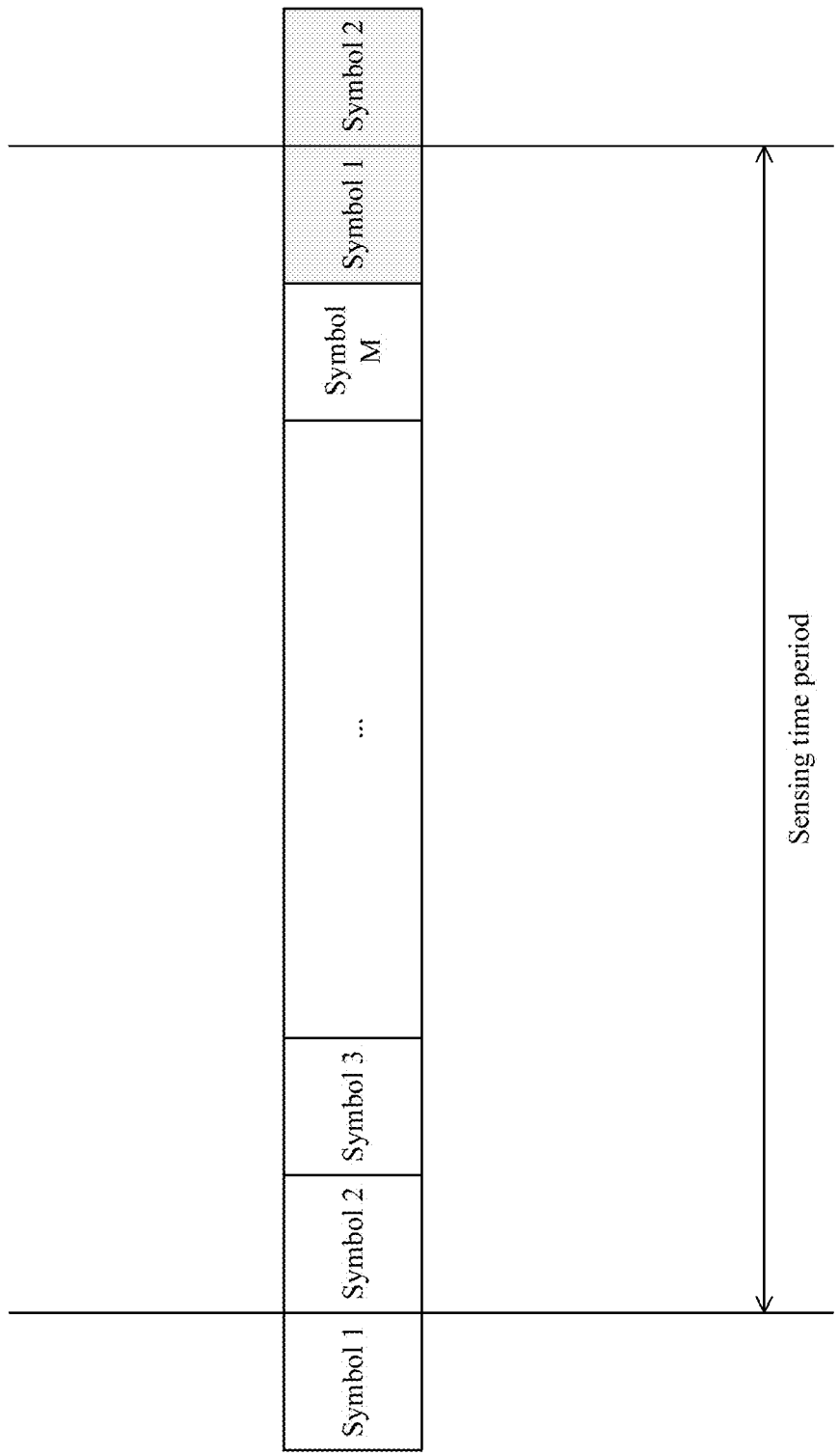
FIG. 6B depicts a diagram of a pseudo random number code in accordance with another embodiment of the present invention.

Please refer to FIG. 6B, which depicts a diagram of a pseudo random number code in accordance with another embodiment of the present invention. The original pseudo random number code includes M symbols (Symbol 1 through Symbol M). A suffix part can be added after the M symbols. In case Q is 2, the suffix part includes two symbols. The first one is Symbol 1. And the second one is Symbol 2.

Figure 6C:
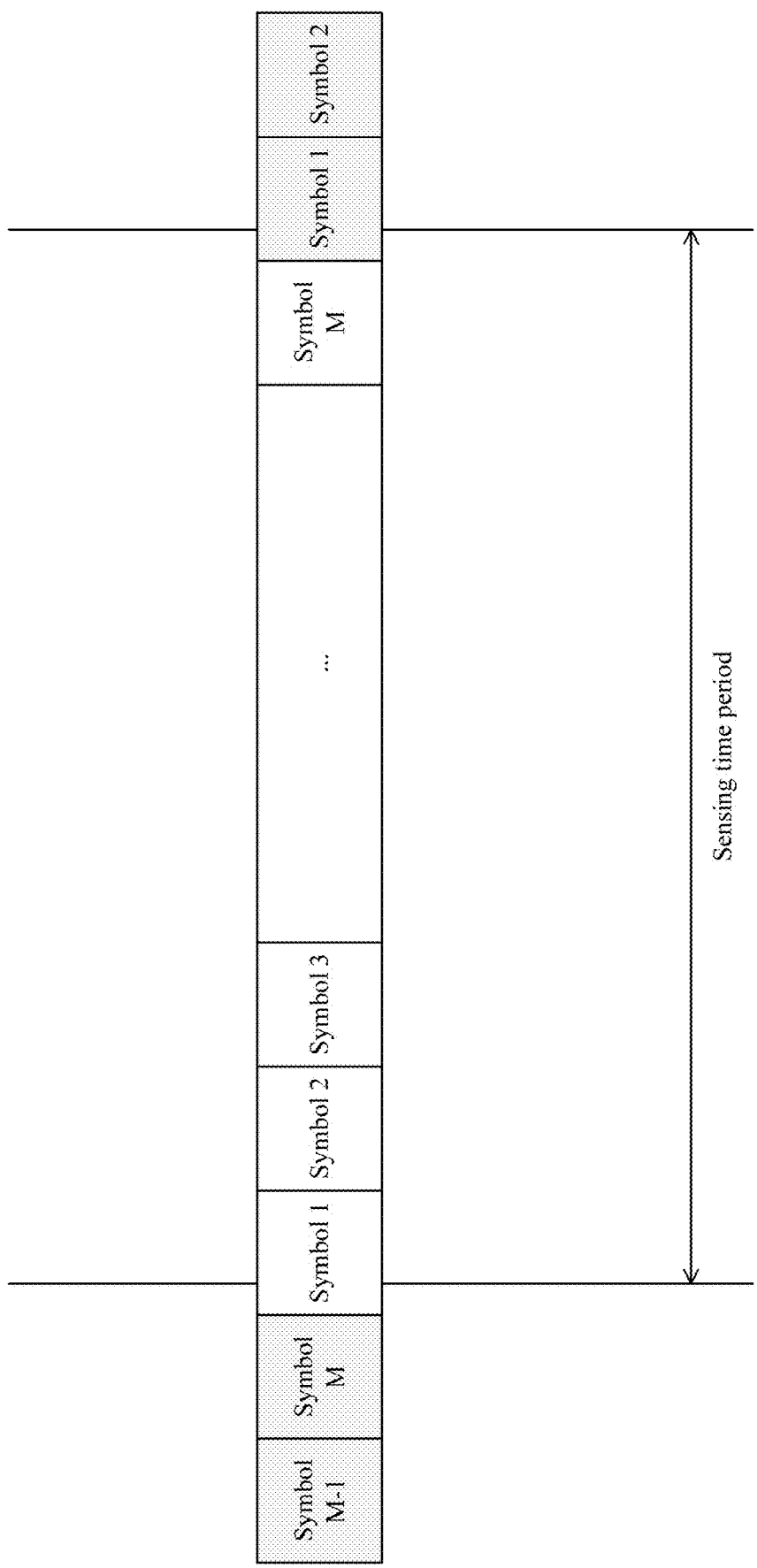
FIG. 6C depicts a diagram of a pseudo random number code in accordance with an embodiment of the present invention.

Please refer to FIG. 6C, which depicts a diagram of a pseudo random number code in accordance with an embodiment of the present invention. The original pseudo random number code includes M symbols (Symbol 1 through Symbol M). A prefix part and a suffix part can be added to the M symbols. In case P is 2, the prefix part includes two symbols. The first one is Symbol (M−1). And the second one is Symbol M. In case P is 2, the prefix part includes two symbols. The first one is Symbol (M−1). And the second one is Symbol M. In case Q is 2, the suffix part includes two symbols. The first one is Symbol 1. And the second one is Symbol 2.

Although in the embodiment as shown in FIG. 6C, P equals to Q. However, P may not equal to Q. In other words, length of the prefix part may not equal to length of the suffix part. In addition, P and Q may not be positive integers. For examples, lengths of P and Q may be 1.5 or 3.7 symbols. It may use phase shifting key to modulate each symbol in order to generate corresponding signal waveforms of the suffix part and the prefix part. The duplicated prefix part or the suffix part may not be exactly modulated signal waveforms corresponding to a multiple of a full symbol.

In the embodiments of the present application, M and N are positive integers larger than 1. P and Q may be positive integers larger than 1 or rational numbers. M is larger than P, M is larger than Q, P may equal to Q.

Figure 7:
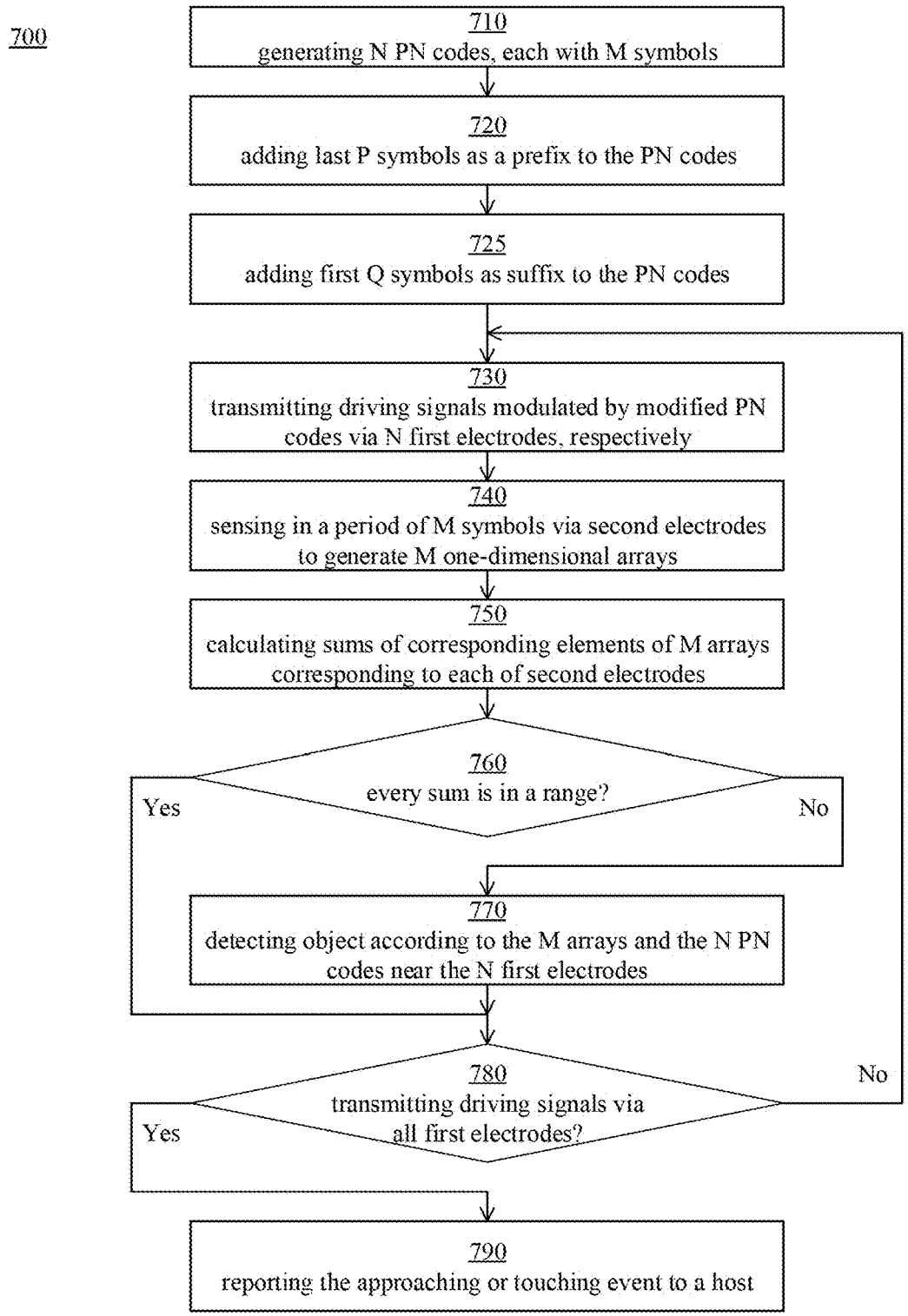
FIG. 7 depicts a flowchart diagram of a touch sensitive processing method according to an embodiment of the present application.

Please refer to FIG. 7, which depicts a flowchart diagram of a touch sensitive processing method according to an embodiment of the present application. The touch sensitive processing method 700 is designed to detect an approaching or touching event by simultaneously emitting driving signals from multiple first electrodes. It may use the touch sensitive processing apparatus 110 to implement the touch sensitive processing method 700. In particular, the touch sensitive processing method 700 may be implemented by the processor module 114 executing software instructions. If any given two steps as shown in FIG. 7 have no causal relationship, the present application does not limit the execution order of these two steps.

Step 710: generating N pseudo random number codes, each of the pseudo random number codes includes M symbols. This step may use software to generate codes or use the aforementioned LFSR circuit to generate codes. Next, the flow may proceed to step 720 or step 725. In the present invention, at least one of steps 720 and 725 should be performed. After performing one or two of steps 720 and 725, the flow proceeds to step 730.

Step 720: adding the last P symbols of the M symbols before each of the pseudo random number codes as a prefix part.

Step 725: adding the first Q symbols of the M symbols after each of the pseudo random number codes as a suffix part.

Step 730: having the driving circuit module 112 transmit driving signals modulated by each one of modified versions of the pseudo random number codes via each one of N first electrodes which did not transmit driving signals. When the step 730 is performed or slightly later, the step 740 is performed together.

Step 740: having the sensing circuit module 113 sense every second electrodes during a time period of M symbols in order to gather M one-dimensional sensing information arrays, respectively. Each element of the one-dimensional sensing information array is a sensed value during a time period of one symbol. Assuming that there are J second electrodes, the j-th element of each of the one-dimensional sensing information arrays stores a sensing value corresponding to the j-th second electrode, where $1<=j<=J$. The sensing value may be logic symbol 1 or logic symbol 0.

Step 750: calculating sums of corresponding elements of M one-dimensional sensing information arrays corresponding to each of the second electrodes. For example, the sum corresponding to the j-th second electrode is added up by each j-th element of the first one-dimensional sensing information array through the M-th one-dimensional sensing information array.

Step 760: based on the aforementioned balance property corresponding to the pseudo random number code, determining whether each one of the sums is fallen in a range. In one embodiment, the range includes a sum of N logic symbol 1. When one of the sums corresponding to the second electrodes falls in the range or equals to the sum of N logic symbol 1 s, it represents that there is no external conductive object approaching or touching intersections between the N first electrodes which transmit driving signals at step 730 and the corresponding second electrode. If so, the flow proceeds to step 780. If one of the sums is out of the range, it represents that there is one external conductive object approaching or touching intersections between the N first electrodes which transmit driving signals at step 730 and the corresponding second electrode. Thus, the flow proceeds to step 770.

Step 770: detecting external conductive objects according to M one-dimensional sensing information array corresponding to the unequaled sum and the N pseudo random number codes. When an external conductive object approaching or touching one of N intersections of the N first electrodes and the second electrode corresponding to the sum, it would make magnificent interference to one of the pseudo random number codes which is transmitted from one of the first electrodes. Hence, it can find out an approaching or touching point is around which intersections according to the different N pseudo random number codes. Person having ordinary skill in the art can understand that this step can be fulfilled according to Code Division Multiple Access technique.

Step 780: determining whether all of the first electrodes transmitted driving signals. When it is determined all of the first electrodes transmitted driving signals, the flow proceeds to step 790. Otherwise, the flow returns to step 730.

Step 790: reporting the approaching or touching event corresponding to the detected external conductive object to a host.

Figure 8:
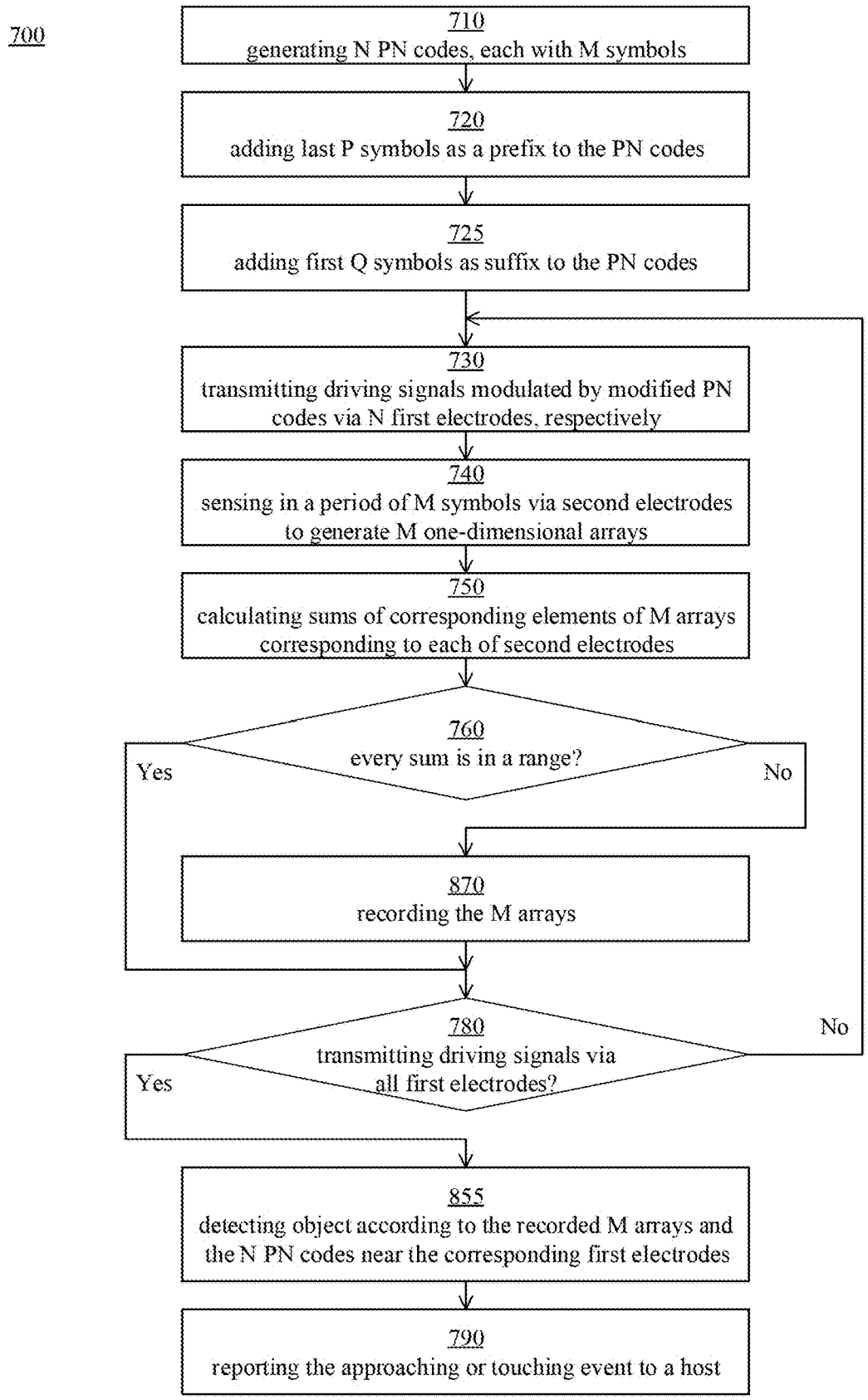
FIG. 8 depicts a flowchart diagram of a touch sensitive processing method according to an embodiment of the present application.

Please refer to FIG. 8, which depicts a flowchart diagram of a touch sensitive processing method according to another embodiment of the present application. The touch sensitive processing method 800 is a variant of the touch sensitive processing method 700. The difference is that the step 770 is replaced by step 870. Since an approaching or touching event may happen to the first or the N-th first electrode of the N first electrodes, one approaching or touching event may be mistaken as two events according to two continuous sensing results of step 740. Therefore, step 870 is configured to store all of the M one-dimensional sensing information arrays sensed at step 740 at first. After the entire touch screen is scanned at once, at step 855, it is configured to detect an approaching or touching object according to all of the stored M one-dimensional sensing information arrays and the N pseudo random number codes. In case the approaching or touching event is happened between the N-th one of a former round of N first electrodes and the first one of a later round of N first electrodes, the step 885 is able to detect a single approaching or touching event according to the sensed results corresponding to these adjacent 2N first electrodes.

One of advantages of the present application is that it does not need to decode the N pseudo random number codes in each scan. Instead, based on the calculating step at step 750 and the determining step at 760, it can determine whether there is any external conductive object appeared in an area of the scan. Since the decode costs more calculation resource, it saves time and power if the number of performing step 770 or step 885 can be reduced.

Another one of advantages of the present application is that it does not need to calibrate a particular touch screen or touch panel 120. Among the existing technologies, touch sensitive processing apparatus 110 needs to perform a calibration procedure to the touch screen or touch panel 120 before it is shipped out of factory or when a corresponding user command is received in order to measure how long the driving signals from each of the first electrodes 121 to arrive the sensing circuit module 113. After the calibration is done, the touch sensitive processing apparatus 110 can determine the sensing timing of the sensing circuit module 113 based on the measured data. However, it takes time to perform calibration and it needs additional storage space to store the measured data. Without the calibration data, the touch sensitive processing apparatus and method provided by the present application can perform fast detection by directly use the touch screen or touch panel 120 in order to save the calibration time and the storage space of the calibration data.

According to an embodiment of the present application, a touch sensitive processing method applicable to a touch panel is provided, the touch panel comprises multiple first electrodes in parallel to a first axis and multiple second electrodes in parallel to a second axis, each of the first electrodes intersect with the second electrodes to form multiple sensing areas but they are not electrically coupled, the touch sensitive processing method comprising: generating N orthogonal pseudo random number (PN) codes, wherein each of the PN codes is constituted of M symbols, where M and N are positive integers larger than 1; generating N modified codes according to the N PN codes, respectively; transmitting driving signals modulated by the N modified PN codes via N of the multiple first electrodes, respectively, and sensing in a period of M symbols via the second electrodes to generate M one-dimensional sensing information arrays; calculating sums of each of corresponding elements of the M one-dimensional sensing information arrays corresponding to the second electrodes, respectively; determining whether each of the sums is in a range; and recording the M one-dimensional sensing information arrays and the corresponding N first electrodes and the N PN codes in response to that at least one of the sums is determined out of the range.

Preferably, in order to detect in blocks, wherein the N first electrodes are adjacent, a first block of the touch panel comprises the N first electrodes.

Preferably, in order to prevent mistaking single one approaching/touching event as two events in two adjacent blocks, the touch sensitive processing method further comprise: transmitting driving signals modulated by the N modified codes via N first electrodes in a second block of the touch panel, respectively, and sensing in a period of M symbols via the second electrodes to generate M second one-dimensional sensing information arrays; calculating second sums of each of corresponding elements of the M second one-dimensional sensing information arrays corresponding to the second electrodes, respectively; determining whether each of the second sums is in a range; recording the M second one-dimensional sensing information arrays and the corresponding N first electrodes and the N PN codes in response to that at least one of the second sums is determined out of the range; and detecting an approaching or touching event near the two of N first electrodes according to the M one-dimensional sensing information arrays and the M second one-dimensional sensing information arrays, the two of N first electrodes and the N PN codes.

Preferably, in order to find out the location of touch event, the touch sensitive processing method further comprise detecting an approaching or touching event near the N first electrodes according to the M one-dimensional sensing information arrays, the N first electrodes and the N PN codes.

Preferably, in order to satisfy the balance property, wherein the modified code of the PN code is one of followings: the corresponding PN code with a prefix part, wherein the prefix part includes the last P symbols of the PN code, where P is a positive integer; the corresponding PN code with a suffix part, wherein the suffix part includes the first Q symbols of the PN code, where Q is a positive integer; and the corresponding PN code with the prefix part and the suffix part.

Preferably, in order to satisfy the balance property, wherein when M is an odd number, the range includes a sum of N logic symbol 1s.

According to an embodiment of the present application, a touch sensitive processing apparatus applicable to a touch panel is provided, the touch panel comprises multiple first electrodes in parallel to a first axis and multiple second electrodes in parallel to a second axis, each of the first electrodes intersect with the second electrodes to form multiple sensing areas but they are not electrically coupled, the touch sensitive processing apparatus comprising: an interconnection network connecting with the first and the second electrodes, respectively; a driving circuit connecting with the interconnection network; a sensing circuit connecting with the interconnection network; and a processor executing instructions stored in non-volatile memory for: generating N orthogonal pseudo random number (PN) codes, wherein each of the PN codes is constituted of M symbols, where M and N are positive integers larger than 1; generating N modified codes according to the N PN codes, respectively; having the driving circuit and the interconnection network for transmitting driving signals modulated by the N modified PN codes via N of the multiple first electrodes, respectively, and having the sensing circuit and the interconnection network sensing in a period of M symbols via the second electrodes to generate M one-dimensional sensing information arrays; calculating sums of each of corresponding elements of the M one-dimensional sensing information arrays corresponding to the second electrodes, respectively; determining whether each of the sums is in a range; and recording the M one-dimensional sensing information arrays and the corresponding N first electrodes and the N PN codes in response to that at least one of the sums is determined out of the range.

Preferably, in order to detect in blocks, wherein the N first electrodes are adjacent, a first block of the touch panel comprises the N first electrodes.

Preferably, in order to prevent mistaking single one approaching/touching event as two events in two adjacent blocks, the processor is further for: having the driving circuit and the interconnection network for transmitting driving signals modulated by the N modified codes via N first electrodes in a second block of the touch panel, respectively, and having the sensing circuit and the interconnection network for sensing in a period of M symbols via the second electrodes to generate M second one-dimensional sensing information arrays; calculating second sums of each of corresponding elements of the M second one-dimensional sensing information arrays corresponding to the second electrodes, respectively; determining whether each of the second sums is in a range; recording the M second one-dimensional sensing information arrays and the corresponding N first electrodes and the N PN codes in response to that at least one of the second sums is determined out of the range; and detecting an approaching or touching event near the two of N first electrodes according to the M one-dimensional sensing information arrays and the M second one-dimensional sensing information arrays, the two of N first electrodes and the N PN codes.

Preferably, in order to find out the location of touch event, the processor is further for detecting an approaching or touching event near the N first electrodes according to the M one-dimensional sensing information arrays, the N first electrodes and the N PN codes.

Preferably, in order to report events to a host, wherein the touch sensitive processing apparatus further comprises an interface module connecting with a host, the processor is further for having the interface module to report the detected approaching or touching event to the host.

Preferably, in order to satisfy the balance property, wherein the modified code of the PN code is one of followings: the corresponding PN code with a prefix part, wherein the prefix part includes the last P symbols of the PN code, where P is a positive integer; the corresponding PN code with a suffix part, wherein the suffix part includes the first Q symbols of the PN code, where Q is a positive integer; and the corresponding PN code with the prefix part and the suffix part.

Preferably, in order to satisfy the balance property, wherein when M is an odd number, the range includes a sum of N logic symbol 1s.

According to an embodiment of the present application, a touch system is provided. The touch system comprises the touch sensitive processing apparatus and the touch panel.

According to an embodiment of the present application, a touch system is provided. The touch system comprises the touch sensitive processing apparatus, the touch panel and the host.

The touch sensitive processing apparatus, the touch system and the touch sensitive processing method thereof take advantages of the balance property. Thus, it may use less computational resources or time to determine whether an approaching or touching event occurs in a block of the touch panel. Except for the anti-interference characteristics contributed by the PN codes, it further accelerates the detection of the approaching or touching event and decreases waste of computational resources.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch sensitive processing method applicable to a touch panel is provided, the touch panel comprises multiple first electrodes in parallel to a first axis and multiple second electrodes in parallel to a second axis, each of the first electrodes intersect with the second electrodes to form multiple sensing areas but they are not electrically coupled, the touch sensitive processing method comprising:
generating N orthogonal pseudo random number (PN) codes, wherein each of the PN codes is constituted of M symbols, where M and N are positive integers larger than 1;
generating N modified codes according to the N PN codes, respectively;
transmitting driving signals modulated by the N modified PN codes via N of the multiple first electrodes, respectively, and sensing in a period of M symbols via the second electrodes to generate M one-dimensional sensing information arrays;
calculating sums of each of corresponding elements of the M one-dimensional sensing information arrays corresponding to the second electrodes, respectively;
determining whether each of the sums is in a range; and
recording the M one-dimensional sensing information arrays and the corresponding N first electrodes and the N PN codes in response to that at least one of the sums is determined out of the range.

2. The touch sensitive processing method as claimed in claim 1, wherein the N first electrodes are adjacent, a first block of the touch panel comprises the N first electrodes.

3. The touch sensitive processing method as claimed in claim 2, further comprise: transmitting driving signals modulated by the N modified codes via N first electrodes in a second block of the touch panel, respectively, and sensing in a period of M symbols via the second electrodes to generate M second one-dimensional sensing information arrays; calculating second sums of each of corresponding elements of the M second one-dimensional sensing information arrays corresponding to the second electrodes, respectively; determining whether each of the second sums is in a range; recording the M second one-dimensional sensing information arrays and the corresponding N first electrodes and the N PN codes in response to that at least one of the second sums is determined out of the range; and detecting an approaching or touching event near the two of N first electrodes according to the M one-dimensional sensing information arrays and the M second one-dimensional sensing information arrays, the two of N first electrodes and the N PN codes.

4. The touch sensitive processing method as claimed in claim 1, further comprise detecting an approaching or touching event near the N first electrodes according to the M one-dimensional sensing information arrays, the N first electrodes and the N PN codes.

5. The touch sensitive processing method as claimed in claim 1, wherein the modified code of the PN code is one of followings: the corresponding PN code with a prefix part, wherein the prefix part includes the last P symbols of the PN code, where P is a positive integer; the corresponding PN code with a suffix part, wherein the suffix part includes the first Q symbols of the PN code, where Q is a positive integer; and the corresponding PN code with the prefix part and the suffix part.

6. The touch sensitive processing method as claimed in claim 1, wherein when M is an odd number, the range includes a sum of N logic symbol 1s.

7. A touch sensitive processing apparatus applicable to a touch panel is provided, the touch panel comprises multiple first electrodes in parallel to a first axis and multiple second electrodes in parallel to a second axis, each of the first electrodes intersect with the second electrodes to form multiple sensing areas but they are not electrically coupled, the touch sensitive processing apparatus comprising:
an interconnection network connecting with the first and the second electrodes, respectively;
a driving circuit connecting with the interconnection network;
a sensing circuit connecting with the interconnection network; and
a processor executing instructions stored in non-volatile memory for:
generating N orthogonal pseudo random number (PN) codes, wherein each of the PN codes is constituted of M symbols, where M and N are positive integers larger than 1;
generating N modified codes according to the N PN codes, respectively; having the driving circuit and the interconnection network for transmitting driving signals modulated by the N modified PN codes via N of the multiple first electrodes, respectively, and having the sensing circuit and the interconnection network sensing in a period of M symbols via the second electrodes to generate M one-dimensional sensing information arrays;
calculating sums of each of corresponding elements of the M one-dimensional sensing information arrays corresponding to the second electrodes, respectively;
determining whether each of the sums is in a range; and
recording the M one-dimensional sensing information arrays and the corresponding N first electrodes and the N PN codes in response to that at least one of the sums is determined out of the range.

8. The touch sensitive processing apparatus as claimed in claim 7, wherein the N first electrodes are adjacent, a first block of the touch panel comprises the N first electrodes.

9. The touch sensitive processing apparatus as claimed in claim 8, wherein the processor is further for:
having the driving circuit and the interconnection network for transmitting driving signals modulated by the N modified codes via N first electrodes in a second block of the touch panel, respectively, and having the sensing circuit and the interconnection network for sensing in a period of M symbols via the second electrodes to generate M second one-dimensional sensing information arrays;
calculating second sums of each of corresponding elements of the M second one-dimensional sensing information arrays corresponding to the second electrodes, respectively;
determining whether each of the second sums is in a range; recording the M second one-dimensional sensing information arrays and the corresponding N first electrodes and the N PN codes in response to that at least one of the second sums is determined out of the range; and
detecting an approaching or touching event near the two of N first electrodes according to the M one-dimensional sensing information arrays and the M second one-dimensional sensing information arrays, the two of N first electrodes and the N PN codes.

10. The touch sensitive processing apparatus as claimed in claim 7, wherein the processor is further for detecting an approaching or touching event near the N first electrodes according to the M one-dimensional sensing information arrays, the N first electrodes and the N PN codes.

11. The touch sensitive processing apparatus as claimed in claim 9, further comprises an interface module connecting with a host, the processor is further for having the interface module to report the detected approaching or touching event to the host.

12. The touch sensitive processing apparatus as claimed in claim 10, further comprises an interface module connecting with a host, the processor is further for having the interface module to report the detected approaching or touching event to the host.

13. The touch sensitive processing apparatus as claimed in claim 7, wherein the modified code of the PN code is one of followings: the corresponding PN code with a prefix part, wherein the prefix part includes the last P symbols of the PN code, where P is a positive integer; the corresponding PN code with a suffix part, wherein the suffix part includes the first Q symbols of the PN code, where Q is a positive integer; and the corresponding PN code with the prefix part and the suffix part.

14. The touch sensitive processing apparatus as claimed in claim 7, wherein when M is an odd number, the range includes a sum of N logic symbol 1s.

15. A touch system, comprising:
a touch panel, comprising multiple first electrodes in parallel to a first axis and multiple second electrodes in parallel to a second axis, each of the first electrodes intersect with the second electrodes to form multiple sensing areas but they are not electrically coupled; and
a touch sensitive processing apparatus, comprising:
a driving circuit connecting with the interconnection network;
a sensing circuit connecting with the interconnection network; and
a processor executing instructions stored in non-volatile memory for:
generating N orthogonal pseudo random number (PN) codes, wherein each of the PN codes is constituted of M symbols, where M and N are positive integers larger than 1;
generating N modified codes according to the N PN codes, respectively; having the driving circuit and the interconnection network for transmitting driving signals modulated by the N modified PN codes via N of the multiple first electrodes, respectively, and having the sensing circuit and the interconnection network sensing in a period of M symbols via the second electrodes to generate M one-dimensional sensing information arrays;
calculating sums of each of corresponding elements of the M one-dimensional sensing information arrays corresponding to the second electrodes, respectively;
determining whether each of the sums is in a range; and
recording the M one-dimensional sensing information arrays and the corresponding N first electrodes and the N PN codes in response to that at least one of the sums is determined out of the range.

16. The touch system as claimed as claim 15, wherein the N first electrodes are adjacent, a first block of the touch panel comprises the N first electrodes.

17. The touch system as claimed as claim 16, wherein the processor is further for:
having the driving circuit and the interconnection network for transmitting driving signals modulated by the N modified codes via N first electrodes in a second block of the touch panel, respectively, and having the sensing circuit and the interconnection network for sensing in a period of M symbols via the second electrodes to generate M second one-dimensional sensing information arrays;
calculating second sums of each of corresponding elements of the M second one-dimensional sensing information arrays corresponding to the second electrodes, respectively;
determining whether each of the second sums is in a range; recording the M second one-dimensional sensing information arrays and the corresponding N first electrodes and the N PN codes in response to that at least one of the second sums is determined out of the range; and
detecting an approaching or touching event near the two of N first electrodes according to the M one-dimensional sensing information arrays and the M second one-dimensional sensing information arrays, the two of N first electrodes and the N PN codes.

18. The touch system as claimed as claim 15, wherein the processor is further for detecting an approaching or touching event near the N first electrodes according to the M one-dimensional sensing information arrays, the N first electrodes and the N PN codes.

19. The touch system as claimed in claim 17, further comprise a host, wherein the touch sensitive processing apparatus further comprises an interface module connecting with the host, the processor is further for having the interface module to report the detected approaching or touching event to the host.

20. The touch system as claimed in claim 18, further comprise a host, wherein the touch sensitive processing apparatus further comprises an interface module connecting with the host, the processor is further for having the interface module to report the detected approaching or touching event to the host.

21. The touch system as claimed in claim 15, wherein the modified code of the PN code is one of followings: the corresponding PN code with a prefix part, wherein the prefix part includes the last P symbols of the PN code, where P is a positive integer; the corresponding PN code with a suffix part, wherein the suffix part includes the first Q symbols of the PN code, where Q is a positive integer; and the corresponding PN code with the prefix part and the suffix part.

22. The touch system as claimed in claim 15, wherein when M is an odd number, the range includes a sum of N logic symbol 1s.

* * * * *